United States Patent [19]

Bargain

[11] 3,839,266

[45] Oct. 1, 1974

[54] ORGANOPOLYSILOXANE COMPOSITIONS CONVERTIBLE TO ELASTOMERS

[75] Inventor: Michel Bargain, Lyon, France

[73] Assignee: Rhone-Poulenc S.A., Paris, France

[22] Filed: Feb. 20, 1973

[21] Appl. No.: 333,450

[30] Foreign Application Priority Data
Feb. 21, 1972  France .............................. 72.05746

[52] U.S. Cl............................................. 260/37 SB
[51] Int. Cl............................................ C08g 51/04
[58] Field of Search ................................ 260/37 SB

[56] References Cited
UNITED STATES PATENTS

| | | |
|---|---|---|
| 3,468,838 | 9/1969 | Loraine et al................... 260/37 SB |
| 3,514,424 | 5/1970 | Noble et al...................... 260/37 SB |
| 3,528,940 | 9/1970 | Modic ............................. 260/37 SB |
| 3,539,530 | 11/1970 | Karstedt....................... 260/37 SB X |
| 3,711,520 | 1/1973 | Pfeifer et al.................... 260/37 SB |

*Primary Examiner*—Lewis T. Jacobs
*Attorney, Agent, or Firm*—Stevens, Davis, Miller '& Mosher

[57] ABSTRACT

An organopolysiloxane composition convertible on curing to an elastomer with good heat and fire resistance comprising an organopolysiloxane rubber, a silica filler, an organic peroxide, a platinum additive and 0.5 – 25 parts of magnesium oxide per 100 parts of rubber.

18 Claims, No Drawings

ORGANOPOLYSILOXANE COMPOSITIONS CONVERTIBLE TO ELASTOMERS

This invention relates to organopolysiloxane compositions which, after curing, can be converted into elastomers and which, in the cured state, possess improved properties of incombustibility.

It is known that organopolysiloxane elastomers have good heat resistance, and that their resistance to combustion, which is greater than that of conventional elastomers, has caused them to be used for obvious safety reasons in industries such as the aeronautical and marine industries. However, since this resistance to combustion is not always sufficient, it has been recommended to incorporate in addition into the elastomers small proportions of platinum, to which there have optionally been added minor proportions of various compounds, which act synergistically with the platinum on the resistance to combustion. Such compositions have increased fire-resistance and make it possible for electrical equipment, containing cables sheathed with the composition to function even after short exposure to fire. Such compositions are, for example, described in French Pat. Nos. 1,486,530 and 1,489,621 and in Belgian Pat. Nos. 753,483 and 753,547.

The present invention provides an organopolysiloxane composition convertible on curing, to an elastomer, which composition comprises (in parts by weight)

a. 100 parts of an organopolysiloxane rubber of viscosity $2 \times 10^6$ to $80 \times 10^6$ centipoises measured at 25°C, the organopolysiloxane being free from hydrogen atoms bonded directly to silicon atoms and is essentially formed by repetition of diorganosiloxy units, the organic radicals which are bonded directly to the silicon atoms, being alkyl, alkenyl, aromatic hydrocarbon, haloalkyl, haloalkenyl or haloaromatic hydrocarbon radicals (the proportion by weight of aromatic radicals being at most 50 percent of all of the organic radicals and the proportion by weight of alkenyl groups being at most 2 percent of the weight of the organopolysiloxane rubber)

b. 5 to 100 parts of a finely divided inorganic filler based on silica, c. 0.1 to 10 parts of an organic peroxide and d. $10 \times 10^{-4}$ to $150 \times 10^{-4}$ parts of an additive comprising platinum (expressed as elemental platinum) and e. 0.5 to 25 parts, preferably 2 - 15 parts, of magesium oxide MgO.

The alkenyl radicals which may be present in the organopolysiloxane rubber are usually vinyl or allyl radicals.

Organopolysiloxane rubbers are well known to those skilled in the art and are described, for example, in French Patent Nos. 1,329,088, 1,382,285 and 1,451,269. They usually consist essentially of one or more diorganopolysiloxanes, which may be identical or different, and which have the formula:

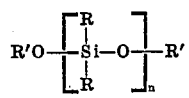

in which the symbols R represent methyl, vinyl or trifluoropropyl radicals or phenyl, dichlorophenyl, trichlorophenyl or tetrachlorophenyl radicals and wherein the symbols R' represent a hydrogen atom or a $SiR_3$ radical, R having the above meaning. $n$ has a value which is sufficiently high, and is generally between 1,000 and 20,000, for the resultant viscosity of the rubber to be within the range defined above.

The organopolysiloxane rubbers, which are generally obtained by cohydrolysis or by polymerisation of various cyclic or linear monomers, can contain a relatively minor proportion of trifunctional groups of the type:

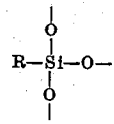

R having the above meaning: this proportion of trifunctional groups is generally not greater than 0.1 percent (expressed as the proportion of silicon atoms present in a trifunctional group relative to the total of all the silicon atoms).

Preferably, the organopolysiloxane rubber is essentially based on diorganopolysiloxanes and the proportion of trifunctional groups in it does not exceed 0.1 percent; the organic radicals are methyl radicals optionally together with vinyl and/or phenyl radicals, the proportion by weight of vinyl groups being less than 2 percent and the proportion of phenyl groups being less than 50 percent.

The finely divided silica, which plays the role of filler for the organopolysiloxane composition, can be a pyrogenic silica with a large specific surface area or a precipitated silica also with a large specific surface area. In order to improve the reinforcing power of the silica, it is particularly recommended to treat it with an organo silicon compound such as octamethylcyclotetrasiloxane, siloxane, or with a silazane such as hexamethyldisilazane. The average diameter of the silica particles is generally between one millimicron and 0.1 micron. The amount of silica added is such that it imparts sufficient hardness to the elastomer.

The organic peroxide is one of the conventional peroxides which are employed for vulcanising silicone rubbers to form elastomers. Examples of such peroxides which can be used, either alone or as a mixture, are cumyl peroxide, benzoyl peroxide, tertiary butyl perbenzoate, 2,4-dichloro-benzoyl peroxide, di-(tertiary butyl) peroxide, tertiary butyl percarbonate and isopropyl percarbonate. The peroxide can be introduced directly or in the form of a paste in a diorganosiloxane oil of sufficient viscosity.

Platinum is present to the extent of 10 to 150 ppm and preferably to the extent of 20 to 100 ppm. It can be introduced in any form which can be incorporated uniformly with the other constituents of the organopolysiloxane composition. It is thus possible to introduce platinum metal in the finely divided state or platinum metal deposited on an inert support such as silica or calcium carbonate. However, it is preferable that the platinum be supplied in the organopolysiloxane composition in the form of compounds or complexes which may be bring into solution in suitable solvents. Soluble compounds of platinum include chloroplatinic acid, complexes of platinous chloride with phosphines, amino-phosphines or nitriles, as well as complexes of platinous halides with olefines, alcohols, ethers or aldehydes. Amongst the platinum complexes, the compounds of the following formula may be mentioned by way of illustration:

$PtCl_6H_2$, $PtCl_2[P(CH_2—CH_3)_3]_2$,

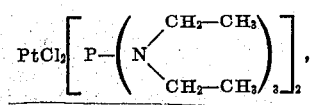

$PtCl_2[P(C_6H_5)_3]_2$,
$PtCl_2[P—(OCH_2—CH_3)_3]_2$, $PtCl_2(CH_2=CH_2)$,

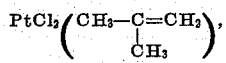

$PtCl_2(C_8H_{16})$ and
$PtCl_2(CH_3—CN)_2$.

The complexes of a platinum halide with alcohols, aldehydes and ethers are, for example, described in French Patent No. 1,367,004.

It is also possible to incorporate into the composition according to the invention other fillers and various adjuvants, examples of which are anti-structure agents, heat stabilisers, pigments and agents which reinforce the resistance to combustion or which have a favourable effect on the behaviour of the mechanical properties.

The anti-structure agents, also known by the name of plasticisers, are generally of an organosilicon nature and are introduced in an amount of 0 to 20 parts per 100 parts of organo silicon rubber. They make it possible to prevent the compositions from curing during storage. Examples of the anti-structure agents are silanes possessing hydrolysable groups or hydroxylic or alkoxylated diorganopolysiloxane oils of low molecular weight. Such compositions are, for example, described in French Pat. No. 1,111,969.

Amongst the heat stabilisers which are well known to those skilled in the art, are iron and manganese salts e.g. iron octanoate, oxides and hydroxides. These additives, which can be used alone or as a mixture, are generally introduced in an amount of 0.01 to 5 percent relative to the weight of the organopolysiloxane rubber employed.

Small proportions of one or more of the following oxides, namely $ZnO$, $SnO_2$, and $TiO_2$, can, in addition, be combined with the magnesium oxide. These oxides, which can be employed in a proportion ranging from 0.1 to 3 percent relative to the rubber, generally have a beneficial effect on the resistance to combustion. The average diameter of the particles of titanium dioxide should preferably be at least $0.1\mu$.

Small proportions of metal phosphates such as magnesium phosphate, calcium phosphate or zinc phosphate, can also be combined with the magnesium oxide. These metal phosphates, all the acid groups of which are not necessarily salified, generally have a favourable action on the behaviour of the mechanical properties when the sample of elastomer is subjected to prolonged exposure to heat. These phosphates can be incorporated in proportions ranging from 0.1 to 3 percent relative to the rubber.

In order to prepare the compositions of the invention, the various components are intimately mixed by means of devices which are well known in the rubber industry it being possible to incorporate them in any order. It is obvious that the solid fillers must be introduced in the form of a very fine powder, the particle size being generally less than 50 microns. However, it is preferable, in a first stage, to disperse the fillers and the pigments in the rubber and then to add the plasticisers, stabilisers, and peroxides in that order. The desired amounts of platinum, magnesium oxide and optionally various metal oxides or salts are then introduced into these mixtures. In order to make it easier to obtain a homogeneous composition, the compounds, which have to be incorporated in small proportions, are first mixed with a diorganopolysiloxane rubber in order to obtain a homogeneous and unctuous paste.

The compositions can be vulcanised by heating under pressure or in air at temperatures ranging from 100° to 300°C, the duration of vulcanisation varying according to the temperature to which the composition is heated. When the vulcanisation is complete, it is preferable to follow it with a re-heating at 200°–250°C so as to impart better heat resistance to the elastic products obtained.

The compositions according to the invention possess improved resistance to combustion, whilst simultaneously possessing good mechanical properties. It was found that the elastomers retained their properties of incombustibility without noticeable deterioration when they were exposed for a long time to a humid atmosphere. Moreover, it was observed that exposure of the elastomers to a high temperature did not reduce the resistance to combustion and only moderately changed the mechanical properties.

In the following Examples which follow the resistance to combustion is demonstrated by means of two standardised tests. The first is that of the Bureau de Normalisation de l'Aeronautique et de l'Espace (Aeronautics and Space Standards Institute) (BNAE; Standard Specification NFL 17,101 A). It consists of placing the sample of elastomer, (of dimensions 14 × 7 × 0.2 cm), held in the vertical position by being fixed between two metal frames, in such a way that the middle of the lower edge of the elastomer is situated 19 mm from the end of the chimney of a Bunsen burner. The flame is adjusted to be at a height of 3.8 cm and a temperature of the order of 800°–845°C, and is kept in contact with the sheet of elastomer for 12 seconds. The flame is removed and the period of time during which the sheet continues to burn or remains incandescent is determined.

The second test, which makes it possible to demonstrate the improvement in the resistance to combustion, is defined in Standard Specification ASTM D 2863-70. It consists of burning a sample of elastomer in a stream of gas consisting of a mixture of oxygen and nitrogen, in varying proportions, and of determining the limiting oxygen index (LOI) which is the value of the ratio flow rate of $O_2$/flow rate of $O_2$ + flow rate of $N_2$ which enables either the combustion to be propagated over a maximum length of 5 cm or the combustion to last for a maximum of 3 minutes.

The Examples which follow ilustrate the invention; temperatures are in degrees Centigrade.

EXAMPLE 1

A mixture consisting of the following components is homogenised for 15 minutes on a roll mill:

| | |
|---|---|
| Polydimethylsiloxane rubber | 112.5 g |
| (This rubber contains 720 mg of vinyl groups per kg; it is terminated by trimethylsiloxy units and has a viscosity of 20 × 10$^6$ centipoises at 25°) | |
| "Aerosil" pyrogenic silica) | 47 g |
| (The silica has a specific surface area of 300 m$^2$/g and has been treated with octamethyl-cyclotetrasiloxane) | |
| Heat stabiliser) | 0.45 g |
| (A paste of iron octanoate in polydimethylsiloxane oil). This paste contains 5.65 mg of iron (in form of iron octanoate) per g | |
| Anti-structure agent A | 0.98 g |
| (α,ω-Dihydroxylic polydimethylsiloxane oil) | |
| Anti-structure agent B | 0.98 |
| (Tetramethylethylenedioxy-dimethylsilane) | |
| Calcined magnesium oxide: MgO | 6.04 g |
| (Particle size less than 40 microns) | |
| Chloroplatinic acid paste | 2.44 g |
| (Chloroplatinic acid hexahydrate (11.9 mg) is dispersed in an organopolysiloxane rubber). | |

When the homogenisation is complete, 2.08 g of a 2,4-dichloro-benzoyl peroxide paste (paste containing 50 percent of peroxide in an organopolysiloxane rubber) are then added and milling is then continued for 15 minutes.

This composition is placed in three parallelepiped shaped moulds, 15 × 15 × 0.2 cm, which have first been heated to 115°, and a pressure of 150 kg/cm$^2$ is applied for 15 minutes. The sheets are removed from the mould and re-heated for 16 hours at 200° and then for 16 hours at 250°. They have the following properties:

| | |
|---|---|
| LOI index | 31.5 |
| Duration of combustion in the BNAE test Standard Specification NFL 17,101/A) | 7 seconds |
| Shore hardness A | 63 |
| Tensile breaking strength | 91 kg/cm$^2$ |
| % Elongation at break | 380 % |
| Tear strength | 16 kg/cm |

By way of comparison, a similar composition, but one which did not contain magnesium oxide, was prepared:

| | |
|---|---|
| Polydimethylsiloxane rubber | 112.5 g |
| Pyrogenic silica | 51.75 g |
| Heat stabiliser | 0.45 g |
| Anti-structure agent A | 0.98 g |
| Anti-structure agent B | 0.98 g |
| Chloroplatinic acid paste | 2.1 g |
| 2,4-Dichloro-benzoyl peroxide paste | 2.08 g |

The elastomers, prepared as above, possess the following properties after they have been re-heated for 16 hours at 200° and then for 16 hours at 250°:

| | |
|---|---|
| LOI index | 26.6 |
| Duration of combustion in the BNAE test | 2 minutes |
| Shore hardness A | 64 |
| Tensile strength | 79 kg/cm$^2$ |
| Elongation at break | 325% |
| Tear strength | 17.3 kg/cm |

EXAMPLE 2

A mixture consisting of the following constituents is homogenised for 15 minutes on rolls:

| | | |
|---|---|---|
| Polydimethylsiloxane rubber | 225 | g |
| Pyrogenic silica | 103.5 | g |
| Heat stabiliser | 0.9 | g |
| Anti-structure agent A | 1.97 | g |
| Anti-structure agent B | 1.97 | g |
| Chloroplatinic acid paste | 4.88 | g |
| 2,4-Dichloro-benzoyl peroxide paste | 4.16 | g |

The compounds employed are those described in Example 1. 170 g of the mixture are removed, 2.55 g of calcined magnesium oxide (particle size less than 50 microns) are added and the whole mixture is milled for 10 minutes. After moulding, vulcanisation and re-heating for 16 hours at 200° and then for 16 hours at 250°, sheets of elastomers are obtained which possess the following properties:

| | |
|---|---|
| LOI index | 32.1 |
| Duration of combustion in the BNAE test | 12 seconds |
| Shore hardness A | 65 |
| Tensile strength | 80 kg/cm$^2$ |
| Elongation at break | 325% |
| Tear strength | 15 kg/cm. |

EXAMPLE 3

A composition is prepared by milling a mixture consisting of the following constituents for 15 minutes:

| | | |
|---|---|---|
| Polydimethylsiloxane rubber | 112.5 | g |
| Pyrogenic silica | 45 | g |
| Heat stabiliser | 0.45 | g |
| Anti-structure agent A | 0.98 | g |
| Anti-structure agent B | 0.98 | g |
| Magnesium oxide | 8.7 | g |
| Chloroplatinic acid paste | 2.44 | g |

The compounds employed are those described in Example 1. After homogenisation, 2.1 g of peroxide paste (as described in Example 1) are added and the whole mixture is milled for 15 minutes.

The sheets of elastomers, prepared as above and re-heated for 16 hours at 200° and then for 16 hours at 250°, have the following properties:

| | |
|---|---|
| LOI index | 31.5 |
| Duration of combustion in the BNAE test | 12 seconds |
| Shore hardness A | 62 |
| Tensile breaking strength | 91 kg/cm$^2$ |
| Elongation at break | 400% |
| Tear strength | 16.6 kg/cm |

EXAMPLE 4

A composition is prepared by milling a mixture consisting of the following constituents for 15 minutes:

| | | |
|---|---|---|
| Polydimethylsiloxane rubber | 112.5 | g |
| Pyrogenic silica | 42.5 | g |
| Heat stabiliser | 0.45 | g |
| Anti-structure agent A | 0.98 | g |
| Anti-structure agent B | 0.98 | g |
| Magnesium oxide | 13.45 | g |
| Chloroplatinic acid paste | 2.44 | g |

The compounds employed are those described in Example 1. 2.1 g of peroxide paste (as described in Example 1) are then added and the whole is milled again for 10 minutes.

The sheets of elastomer, prepared as above and reheated for 16 hours at 200° and then for 16 hours at 250°, have the following properties:

| | |
|---|---|
| LOI index | 31.1 |
| Duration of combustion in the BNAE test | 5 seconds |
| Shore hardness A | 62 |
| Tensile breaking strength | 91 kg/cm² |
| Elongation | 407% |
| Tear strength | 15.1 kg/cm |

EXAMPLE 5

A mixture consisting of the following constituents is homogenised for 15 minutes on a mill:

| | | |
|---|---|---|
| Polydimethylsiloxane rubber | 112.5 | g |
| Pyrogenic silica | 45 | g |
| Heat stabiliser | 0.45 | g |
| Anti-structure agent A | 0.98 | g |
| Anti-structure agent B | 0.98 | g |
| Calcined magnesium oxide | 6.04 | g |
| Stannic oxide $SnO_2$ | 2.6 | g |
| Chloroplatinic acid paste | 2.44 | g |
| Peroxide paste | 2.08 | g |

The compounds employed are those described in Example 1 with the exception of the stannic oxide. The sheets obtained according to the usual treatment have the following properties:

| | |
|---|---|
| LOI index | 34.6 |
| Duration of combustion in the BNAE test | 8 seconds |
| Shore hardness A | 64 |
| Tensile strength | 82 kg/cm² |
| Elongation at break | 340% |
| Tear strength | 15.2 kg/cm |

EXAMPLE 6

A mixture consisting of the following constituents is milled for 15 minutes:

| | | |
|---|---|---|
| Polydimethylsiloxane rubber | 112.5 | g |
| Pyrogenic silica | 45 | g |
| Heat stabiliser | 0.45 | g |
| Anti-structure agent A | 0.98 | g |
| Anti-structure agent B | 0.98 | g |
| Calcined magnesium oxide | 8.7 | g |
| Chloroplatinic acid paste | 2.44 | g |
| Peroxide paste | 2.08 | g |

The compounds employed are those described in Example 1. After homogenisation, 1.74 g of pyrogenic titanium oxide (particle size less than 50 microns) are added and the whole mixture is milled for 15 minutes.

The sheets obtained according to the usual treatment have the following properties:

| | |
|---|---|
| LOI index | 34.4 |
| Duration of combustion in the BNAE test | 8 seconds |
| Shore hardness A | 64 |
| Tensile strength | 81.5 kg/cm² |
| Elongation at break | 335% |
| Tear strength | 15.2 kg/cm |

EXAMPLE 7

A mixture consisting of the following constituents is milled for 15 minutes:

| | | |
|---|---|---|
| Polydimethylsiloxane rubber | 112.5 | g |
| Pyrogenic silica | 47 | g |
| Heat stabiliser | 0.45 | g |
| Anti-structure agent A | 0.98 | g |
| Anti-structure agent B | 0.98 | g |
| Calcined magnesium oxide | 6.1 | g |
| Trimagnesium phosphate $Mg_3(PO_4)_2.5\ H_2O$ | 1.73 | g |
| Chloroplatinic acid paste | 2.44 | g |

The compounds employed are those described in Example 1, apart from the tri-magnesium phosphate. After homogenisation, 2.1 g of a dichloro-benzoyl peroxide paste are added and the whole mixture is milled again for 10 minutes.

The sheets obtained according to the usual treatment are re-heated for 16 hours at 200°. They have the following properties:

| | |
|---|---|
| LOI index | 30.7 |
| Duration of combustion in the BNAE test | 7 seconds |
| Shore hardness A | 60 |
| Tensile breaking strength | 97 kg/cm² |
| Elongation at break | 448% |
| Tear strength | 18.7 kg/cm |

EXAMPLE 8

A mixture consisting of the following constituents is milled on rolls for 15 minutes:

| | | |
|---|---|---|
| Polydimethylsiloxane rubber | 112.5 | g |
| Pyrogenic silica | 45 | g |
| Heat stabiliser | 0.45 | g |
| Anti-structure agent A | 0.98 | g |
| Anti-structure agent B | 0.98 | g |
| Calcined magnesium oxide | 8.7 | g |
| Chloroplatinic acid paste | 3.42 | g |
| Peroxide paste | 2.1 | g |

The compounds employed are those described in Example 1. The sheets obtained according to the usual treatments are re-heated for 16 hours at 200° and then for 16 hours at 250°. They have the following properties:

| | |
|---|---|
| LOI index | 33.2 |
| Duration of combustion in the BNAE test | 11 seconds |
| Shore hardness A | 64 |
| Tensile strength | 87 kg/cm² |
| Elongation at break | 347% |
| Tear strength | 14.9 kg/cm |

An identical composition is prepared and cured to give an elastomer in accordance with the usual conditions, but it is re-heated for 16 hours at 200° and then exposed to a humid atmosphere for 24 hours (relative humidity: RH = 50). The LOI index is then measured and found to be 30.4.

Another portion of the elastomer is kept for 136 hours in an atmosphere saturated with water (relative humidity: RH = 100). The LOI index is then 30.2 These measurements show that the cured elastomers retain their good resistance to combustion even after prolonged exposure to moisture.

In the specification of U.S. Ser. No. 333,449 (A/20330) filed Feb. 20, 1973 in the name of the Applicant is described and claimed an organopolysiloxane composition and the elastomer obtained therefrom on curing the composition comprising (in parts by weight)

a. 100 parts of an organopolysiloxane rubber of viscosity $2 \times 10^6$ to $80 \times 10^6$ centipoises measured at 25°C, the organopolysiloxane being free from hydrogen atoms bonded directly to silicon atoms and being essentially formed by repetition of diorganosiloxy units, the organic radicals, which are bonded directly to the silicon atoms being alkyl, alkenyl, aromatic hydrocarbon, haloalkyl, haloalkenyl or haloaromatic hydrocarbon radicals (the proportion by weight of aromatic radicals being at most 50 percent of all of the organic radicals and the proportion by weight of alkenyl groups being at most 2 percent of the weight of the organopolysiloxane rubber)

b. 5 to 100 parts of a finely divided inorganic filler based on silica, c. 0.1 to 10 parts of an organic peroxide, d. $10 \times 10^{-4}$ to $150 \times 10^{-4}$ parts of an additive comprising platinum (expressed as elemental platinum)

e. 0.5 to 10 parts of a pyrogenic titanium dioxide with an average particle diameter of less than 0.1 micron, and f. 0.01 to 2 parts of metal oxide, which is zinc oxide (ZnO, aluminium oxide ($Al_2O_3$) magnesium oxide (MgO) or tin oxide ($SnO_2$).

I claim:

1. An organopolysiloxane composition convertible on curing to an elastomer, which composition comprises (in parts by weight)

a. 100 parts of an organopolysiloxane of viscosity $2 \times 10^6$ to $80 \times 10^6$ centipoises measured at 25°, the organopolysiloxane being free from hydrogen atoms bonded directly to silicon atoms and is essentially formed by repetition of diorganosiloxy units, the organic radicals which are bonded directly to the silicon atoms, being alkyl, alkenyl, aromatic hydrocarbon, haloalkyl, haloalkenyl or haloaromatic hydrocarbon radicals (the proportion by weight of aromatic radicals being at most 50 percent of all of the organic radicals and the proportion by weight of alkenyl groups being at most 2 percent of the weight of the organopolyiloxane rubber)

b. 5 to 100 parts of a finely divided inorganic filler based on silica, c. 0.1 to 10 parts of an organic peroxide d. $10 \times 10^{-4}$ to $150 \times 10^{-4}$ parts of platinum in the form of a compound of platinum e. 0.5 to 25 parts of magnesium oxide MgO, and f. 0.1 to 3 parts of at least one additive selected from the group consisting of stannic oxide and metal phosphates.

2. A composition according to claim 1, which comprises in addition, at least one adjuvant which is a pigment, plasticizer or stabiliser.

3. A composition according to claim 1 wherein the organic radicals in the organopolysiloxane are methyl radicals or methyl radicals together with at least one vinyl or phenyl radical.

4. A composition according to claim 1, wherein the organopolysiloxane has a proportion of trifunctional mono-organosiloxy groups not greater than 0.1 percent.

5. A composition according to claim 1 wherein the amount of magnesium oxide is 2 to 15 parts.

6. A composition according to claim 1 wherein the filler (b) has a particle size of less than $50\mu$.

7. A composition according to claim 1 wherein the filler (b) is silica treated with an organo silicon compound.

8. An organopolysiloxane composition according to claim 1 wherein the organopolysiloxane is a polydimethylsiloxane of viscosity $2 \times 10^6$ centipoise at 25°C terminated with trimethylsiloxy groups and containing 720 mg of vinyl groups per kg, the silica based filler is silica having a specific surface area of 300 $m^2/g$, the platinum compound is chloroplatinic acid, the organic peroxide is 2,4-dichlorobenzoyl peroxide and additionally comprising iron octanoate as a heat stabiliser and an $\alpha,\omega$-dihydroxy polydimethylsiloxane oil and a tetramethylethylene dioxy-dimethylsilane as anti-structure agents.

9. An elastomer obtained by curing a composition as claimed in claim 8.

10. A composition according to claim 1 wherein the metal phosphate is a magnesium phosphate.

11. An elastomer obtained by curing a composition as claimed in claim 1.

12. An elastomer according to claim 11 which comprises in addition, at least one adjuvant which is a pigment, plasticiser or stabiliser.

13. An elastomer according to claim 11 wherein the organic radicals are methyl radicals or methyl radicals together with at least one vinyl or phenyl radical.

14. An elastomer according to claim 11 wherein the organopolysiloxane in the composition has a proportion of trifunctional monoorganosiloxy groups not greater than 0.1 percent.

15. An elastomer according to claim 11 wherein the amount of magnesium oxide is 2 to 15 parts.

16. An elastomer according to claim 11 wherein the filler (b) has a particle size of less than $50\mu$.

17. An elastomer according to claim 11 wherein the filler (b) is silica treated with an organo silicon compound.

18. An elastomer according to claim 11 wherein the metal phosphate is a magnesium phosphate.

* * * * *